(12) United States Patent
Walding et al.

(10) Patent No.: US 11,483,106 B1
(45) Date of Patent: Oct. 25, 2022

(54) ENCODING AND MODULATION SYSTEMS AND METHODS FOR ULTRA LOW SIGNAL TO NOISE RATIO WIDEBAND RADIO FREQUENCY COMMUNICATION

(71) Applicant: CNF Technologies Corporation, San Antonio, TX (US)

(72) Inventors: Christopher John Walding, Helotes, TX (US); Xiangguang Feng, Fort Pierce, FL (US); Phillip D. Neumiller, Wisconsin Rapids, WI (US)

(73) Assignee: CNF Technologies Corporation, San Antonio, TX (US)

( * ) Notice: Subject to any disclaimer, the term of this patent is extended or adjusted under 35 U.S.C. 154(b) by 0 days.

(21) Appl. No.: 17/544,111

(22) Filed: Dec. 7, 2021

(51) Int. Cl.
*H04L 5/00* (2006.01)
*H04L 27/26* (2006.01)

(52) U.S. Cl.
CPC .............. *H04L 5/001* (2013.01); *H04L 5/006* (2013.01); *H04L 27/2656* (2013.01)

(58) Field of Classification Search
CPC ...... H04L 5/001; H04L 5/006; H04L 27/2656
See application file for complete search history.

(56) References Cited

U.S. PATENT DOCUMENTS

| | | |
|---|---|---|
| 7,860,147 B2 | 12/2010 | Moffatt |
| 8,433,012 B2 | 4/2013 | Sen et al. |
| 8,451,879 B2 | 5/2013 | Kennedy et al. |
| 8,451,916 B2 | 5/2013 | Kwon et al. |

OTHER PUBLICATIONS

M.L. Moher; J.H. Lodge; "TCMP-a modulation and coding strategy for Rician fading channels," IEEE Journal on Selected Areas in Communications, vol. 7, Issue: 9, 1989 (Year: 1989).*
F. Tufvesson;T. Maseng; "Pilot assisted channel estimation for OFDM in mobile cellular systems," 1997 IEEE 47th Vehicular Technology Conference. Technology in Motion, vol. 3, 1997 (Year: 1997).*

* cited by examiner

*Primary Examiner* — Nader Bolourchi
(74) *Attorney, Agent, or Firm* — Pete Adams Law, PLLC

(57) ABSTRACT

Systems and methods for the secure transmission of data and algorithms are disclosed. The coding and modulation schemes meet the need of low signal-to-noise (SNR) ratio applications in areas of high interference. A radio transmitter is used to transmit data signals and a radio receiver is used to receive signals. The new coding algorithms and modulation for wideband communication at very low SNR domains. Systems use orthogonal frequency-division multiplexing modulation and a channel pilot algorithm for timing synchronization and frame alignment. Systems also use an orthogonal code, a super orthogonal convolutional code, and a block code to achieve channel capacity within 80% of the Shannon limit in the subzero decibel (dB) domain with reasonable decoding complexity. In an implementation example given, a 12.5 MHz band radio can transmit at a 108 kbps user data rate at −20 dB SNR and escape adversity detection.

8 Claims, 8 Drawing Sheets

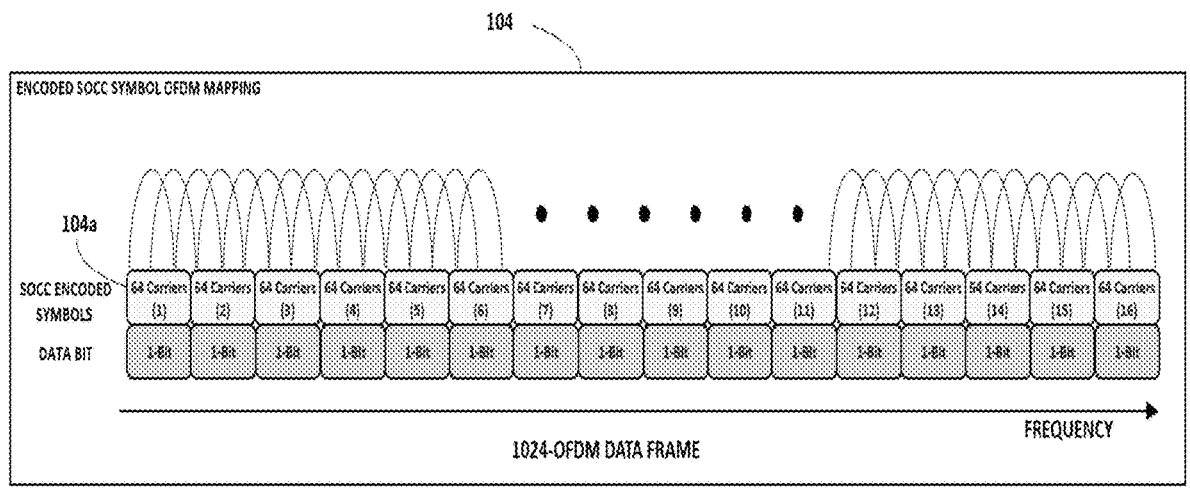
FIG. 5 (Amended)

ENCODING AND MODULATION SYSTEMS AND METHODS FOR ULTRA LOW SIGNAL TO NOISE RATIO WIDEBAND RADIO FREQUENCY COMMUNICATION

CROSS-REFERENCE TO RELATED APPLICATIONS

This is a Nonprovisional U.S. patent application filed under 35 U.S.C. 111(a). No benefit claim to any prior application is made.

BACKGROUND OF THE INVENTION

1. Field of the Invention

The present invention relates generally to the field of secure radio communications. More particularly, the present invention relates to a system and method for encoding and modulating radio frequencies with ultra-low signal-to-noise ratios (SNR).

2. Description of Related Art

In wireless communication, most radios are designed for high signal-to-noise (SNR) and low interference environments. However, there are applications that require radios to work in very low SNR and strong interference environments. For these types of applications, it is preferred that the radio is hard to detect or intercept by adversaries. There is a need in the field of radio communications for a system and method for encoding and modulating radio frequencies with ultra-low SNR.

SUMMARY OF THE INVENTION

In this invention, we introduce a radio architecture that includes a coding and modulation scheme that meets the need of low SNR applications in areas of high interference. Systems and methods for the secure transmission of data and algorithms are disclosed herein. A radio transmitter is used to transmit data signals and a radio receiver is used to receive signals. The invention implements new coding algorithms and modulation for wideband communication at very low SNR ratio domains. Example systems/methods use orthogonal frequency-division multiplexing (OFDM) modulation and a channel pilot algorithm for timing synchronization and frame alignment. Systems also use an orthogonal code (e.g., Hadamard code), a super orthogonal convolutional code, and a block code to achieve channel capacity within 80% of the Shannon limit in the subzero (negative) dB SNR domain with reasonable decoding complexity. In an implementation example given, a 12.5 MHz band radio can transmit at a 108 kbps user data rate at −20 dB SNR and escape adversity detection. The algorithms can be scaled with bandwidth and SNR. The algorithms may be implemented on computing devices using software, on embedded hardware platforms implemented as firmware (for example using HDL), host hardware platforms, or as hardware components.

Systems and methods can be implemented using OFDM signal modulation with or without requiring either a block encoder or an interleaver. Similarly, OFDM signal demodulation can be implemented without requiring either a de-interleaver or a block decoder. A super orthogonal convolutional code (SOCC) encoder generates an inner code for encoding the data. In traditional systems, a low-density parity check (LDPC) code or a Turbo code is used for low SNR channels. LDPC codes and Turbo codes have high complexity but long latency.

The SOCC encoder is an innovative coding scheme that can be decoded using the Viterbi algorithm. The SOCC encoder operates in low SNR channels with reduced complexity, improved latency and implements efficient processing. The SOCC encoder outputs an orthogonal code, which is transferred to OFDM subcarriers for modulation. The SOCC encoder outputs a 64-bit orthogonal code which is transferred to OFDM subcarriers. The 64-bit orthogonal matrix is mapped to OFDM subcarriers. A novel pilot system algorithm guarantees stability of symbol timing, carrier frequency alignment, and phase reference for up to 1000 OFDM symbols when using a 1 part per million (ppm) clock accuracy. The pilot system does not implement a cyclic prefix. Indexed OFDM allows for simplified receiver processing based on symbol correlation.

BRIEF DESCRIPTION OF THE DRAWINGS

FIG. 5 illustrates a 64-bit orthogonal matrix mapped to a plurality of OFDM subcarriers.

DETAILED DESCRIPTION OF THE INVENTION

Figure 1:
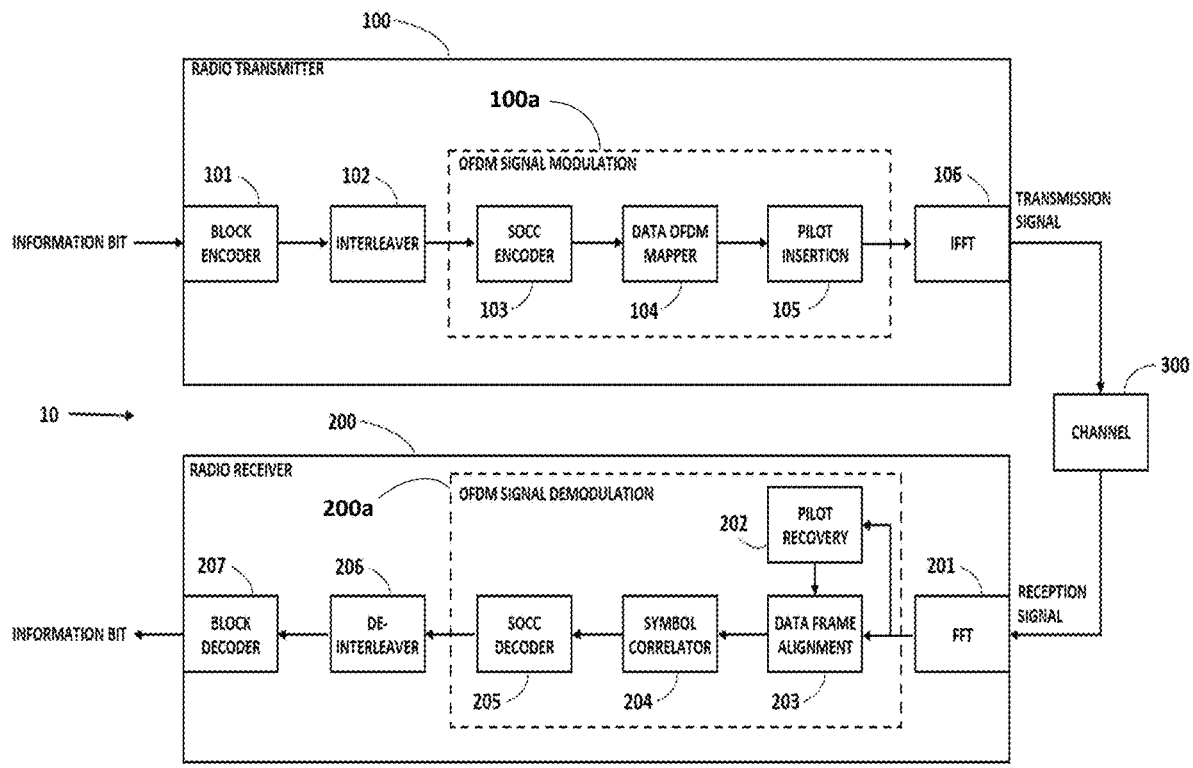
FIG. 1 illustrates a block flow diagram illustrating a system and method for the flow of data and algorithms implemented in the invention.

The following descriptions relate principally to preferred embodiments, while a few alternative embodiments may also be referenced on occasion, although it should be understood that many other alternative embodiments would also fall within the scope of the invention. The embodiments disclosed are not to be construed as describing limits to the invention, whereas the broader scope of the invention should instead be considered with reference to the claims, which may be now appended or may later be added or amended in this or related applications. Unless indicated otherwise, it is to be understood that terms used in these descriptions generally have the same meanings as those that would be understood by persons of ordinary skill in the art. It should also be understood that terms used are generally intended to have the ordinary meanings that would be understood within the context of the related art and they generally should not be restricted to formal or ideal definitions, conceptually encompassing equivalents, unless and only to the extent that a particular context clearly requires otherwise. In light of the present disclosure, those of ordinary skill in the art should also appreciate that many changes can be made relative to the disclosed embodiments while still obtaining a comparable function or result without departing from the spirit and scope of the disclosure.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. Furthermore, unless explicitly dictated by the language, the term "and" may be interpreted as "or" in some instances. When referencing values, the term "about" may be used to indicate an approximate value, generally one that could be read as being that value plus or minus half of the value. "A" or "an" and the like may mean one or more, unless clearly indicated otherwise. Such "one or more" meanings are most especially intended when references are made in conjunction with open-ended words such as "having," "comprising" or "including." Likewise, "another" object may mean at least a second object or more. Thus, in the context of this specification, the term "comprising" is used in an inclusive sense and thus should be understood as meaning "including, but not limited to." As used herein, the use of "may" or "may be" indicates that a modified term is appropriate, capable, or suitable for an indicated capacity, function, or usage, while considering that in some circumstances the modified term may sometimes not be appropriate, capable, or suitable. A computing device, as described herein, refers to a device comprising at least a memory and a processor that includes a desktop computer, a laptop computer, a tablet computer, a vehicle mount computer, or a portable computer (e.g., smart phone). "Plurality" refers to two or more devices or components. Any "examples" described herein are non-limiting.

Referring to FIG. 1, there is shown a block flow diagram 10 illustrating a system and method for the flow of data and algorithms implemented in the invention. A radio transmitter 100 is used to transmit signals, and the top box diagram shown in FIG. 1 illustrates the algorithms and steps involved in generating and transmitting a signal. A radio receiver 200 is used to receive signals, and the bottom box diagram shown in FIG. 1 illustrates the algorithms and steps involved in receiving and processing a signal. The block flow diagram 10 illustrates the combination of both the transmitting and receiving of signals. The invention implements new coding algorithms and modulation for wideband communication at very low SNR ratio domains. The example system 10 uses orthogonal frequency-division multiplexing (OFDM) modulation and a channel pilot algorithm for timing synchronization and frame alignment. The system 10 also uses an orthogonal code (e.g., Hadamard code), a super orthogonal convolutional code and a block code to achieve channel capacity within 80% of the Shannon limit in the subzero (negative) dB SNR domain with reasonable decoding complexity. The algorithms can be scaled with bandwidth and SNR. The algorithms may be implemented on computing devices using software, on embedded hardware platforms implemented as firmware (for example using HDL), host hardware platforms, or as hardware components.

For systems implementing block encoding and interleaving, the first step is to encode packet data using a block encoder 101. For example, an outer block code, e.g. a Bose-Chaudhuri-Hocquenghem (BCH) block encoder, can be implemented. Other types of block encoders 101 besides BCH can be selected based on the coding rate and bit error rate (BER) required by the system. Secondly, the BCH encoded data is interleaved using an interleaver 102. Those of ordinary skill in the field will understand how standard block encoders and interleavers function.

Systems and methods can be implemented using OFDM signal modulation 100a without requiring either a block encoder 101 or an interleaver 102. Similarly, OFDM signal demodulation 200a can be implemented without requiring either a de-interleaver 206 or a block decoder 207.

After the data is interleaved 102, the data is processed for modulation 100a and transferred to a SOCC encoder 103 with a specified coding rate (code rate) (e.g., "1/8"). The SOCC encoder 103 generates an inner code for encoding the data. The coding rate refers to the proportion of the datastream that is useful (non-redundant). That is, if the code rate is "k/n" for every bits of useful information, the coder generates a total of "n" bits of data, of which "n-k" are redundant. In traditional systems, a low-density parity check (LDPC) code or a Turbo code is used for low SNR channels. LDPC codes and Turbo codes have high complexity but long latency. The SOCC encoder 103 is an innovative coding scheme that can be decoded using the Viterbi algorithm. The SOCC encoder 103 operates in low SNR channels with reduced complexity, improved latency and implements efficient processing. The SOCC encoder 103 outputs a $2^{N-1}$-bit orthogonal code, which is transferred to OFDM subcarriers 104 for modulation. The value of "N" is the number of single bit registers 103 used to generate the SOCC code.

With reference to FIG. 1 as a baseline for comparison, the system 10 achieves a channel capacity of 108 kbps in a channel bandwidth of 12.5 MHz with a −20 dB SNR and a 1/64 rate of super-orthogonal Hadamard convolutional encoding. In this example, the system 10 uses a 7-bit SOCC register pipeline and orthogonal (e.g., Hadamard) codes of length "64" to map encoded data bits on to 1024-OFDM subcarriers 104. A novel pilot system algorithm guarantees stability of symbol timing, carrier frequency alignment and phase reference for up to 1000 OFDM symbols when using a 1 part per million (ppm) clock accuracy. The pilot system does not implement a cyclic prefix. Indexed OFDM allows for simplified receiver processing based on symbol correlation. One of many practical uses of the signal waveform generated by the system 10 is to support low-probability of detection (LPD). The signal can propagate well below the noise floor avoiding energy detection and mitigating against more sophisticated techniques such as cyclo-stationary detection. The system 10 can also be implemented in low-rate communications and control applications, where survivability is more important than bandwidth efficiency.

Figure 2:
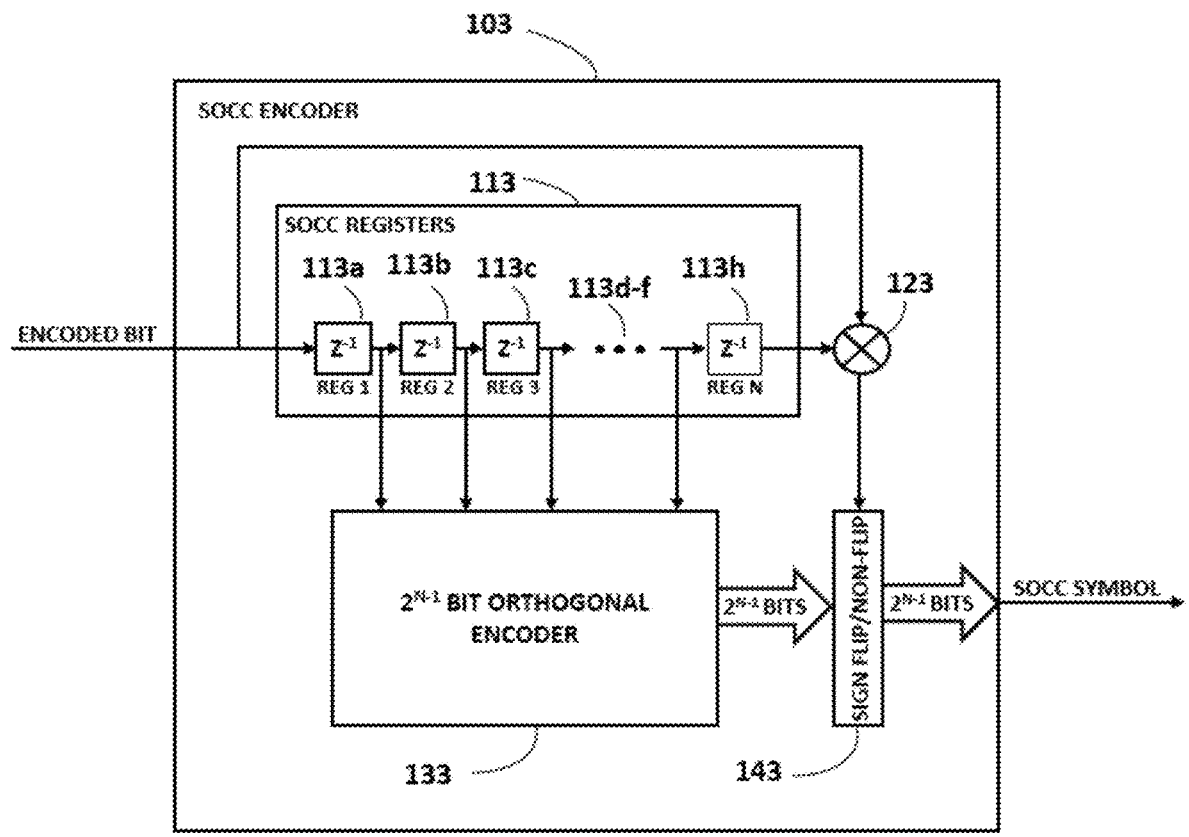
FIG. 2 illustrates a flow diagram of an algorithm for the SOCC encoder.

Referring to FIG. 2, there is shown a flow diagram of an algorithm for the SOCC encoder 103. The input data is shifted through a register pipeline. The size of the SOCC encoder 103 can be an arbitrary integer number of registers. The code set can be any orthogonal code set. In this example, a Hadamard code set is used. For example, the number of registers could be four, five, six, seven, eight, etc. The orthogonal vector can be vectors from a Hadamard matrix or any other orthogonal matrix set with a minimum length of $2^{(N-1)}$, where "N" is the length of the state register. At each cycle, there are a total of eight bits of data available in the pipeline including the input data 113 and data of the registers R1 (113a), R2 (113b), R3 (113c), R4 (113d), R5 (113e), R6 (113f) and RN(113h). The SOCC encoder 103 outputs a super orthogonal code 143, which is either a vector from a 64-bit Hadamard matrix (orthogonal code) or a reverse vector from the matrix. The SOCC encoder 103 output is determined as follows: the values of the registers determine the index of the 64-bit vector and the bitwise XOR (123) of the input bit and the register RN (113h) determines if the vector will be reversed.

The SOCC encoder 103 is a coding scheme that achieves a greater than 20 dB processing gain and allows the waveform to receive and recover data when the waveform is received with a SNR ratio of approximately −20 dB. The achievable SNR performance will vary dependent on specified SOCC parameters and waveform characteristics. It is a novel technique that can be considered a spread spectrum system that spreads user data over a wider frequency band, such as accomplished in frequency hopping and direct sequence pseudo-noise systems/protocols (e.g., CDMA).

Figure 3:
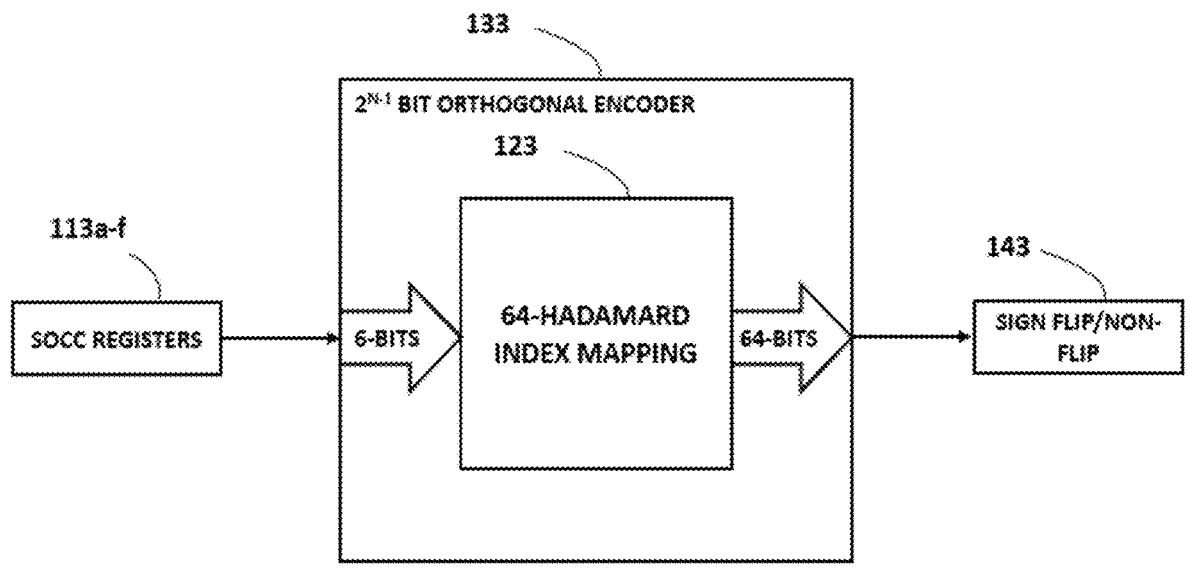
FIG. 3 illustrates the SOCC encoder output of orthogonal code which is transferred to OFDM subcarriers for modulation.

Referring to FIG. 3, the SOCC encoder 103 outputs a $2^{N-1}$-bit orthogonal code 133, which is transferred to OFDM subcarriers 104 for modulation. The value of "N" is the number of single bit registers 103 used to generate the SOCC code. In this example, the SOCC encoder 103 outputs a 64-bit orthogonal code which is transferred to OFDM subcarriers 104. The 64-bit orthogonal matrix is mapped to OFDM subcarriers 104, as shown in FIG. 5. The algorithm in the example system 10 uses a 1024-OFDM subcarrier modulation format. Differing from traditional OFDM, the system 10 has no cyclical prefix between OFDM symbols. Cyclical prefix is not necessary for a few reasons. The first reason is that the timing information of the OFDM symbols is provided by the pilot, so there is no need to use a cyclic prefix for timing recovery. The second reason is that due to having a low SNR, intersymbol interference (ISI) is not a concern in contrast to traditional OFDM. The number of OFDM subcarriers 104 can vary and is not limited to 1024. The pilot algorithm can implement any number of OFDM subcarriers. The pilot provides a novel method for synchronizing OFDM frames in a waveform traditionally accomplished using a cyclic prefix (LTE, etc.). Traditionally, a cyclic prefix allows for synchronizing a waveform on an OFDM frame-by-frame basis and mitigates against delay spread inter-symbol interference (ISI). A cyclic prefix introduces frequency correlation features that are prone to cyclostationary detection. In this system and method 10, fading is mitigated because it is operating at very low SNR where noise is dominate and fading is minimized. The pilot may be used in any OFDM waveform to remove dependence on a cyclic prefix, even when a SOCC encoder 103 is not implemented.

Figure 4:
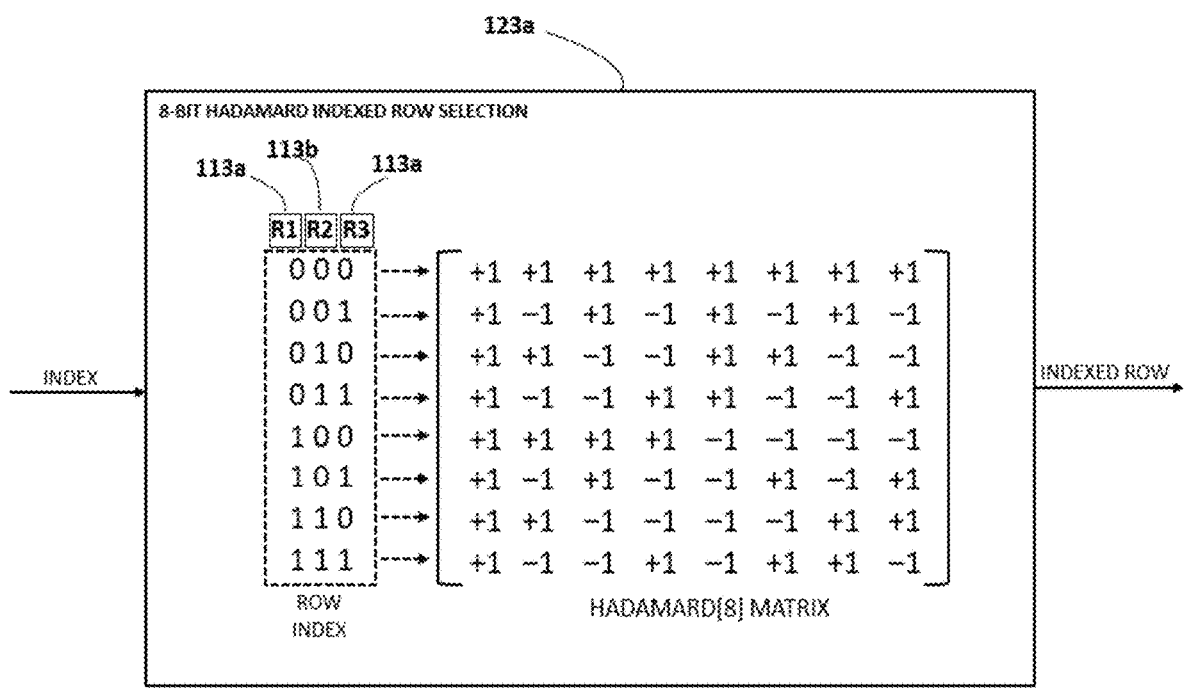
FIG. 4 illustrates an indexed 8-bit Hadamard matrix.

Referring to FIG. 4, there is shown an indexed 8-bit Hadamard matrix 123a. To achieve orthogonality, "1" and "−1" are used in the Hadamard matrix instead of "0" and "1". For example, for an input pipeline of "10110", where the first digit is the input bit and the next four digits are R1-R4, the output is a Hadamard vector indexed by R1-R3 "011", which is reversed since the XOR of input bit "1" and R4 bit "0" is "1". In this example, the SOCC encoder 103 output would be "−1 1 1 −1 −1 1 1 −1".

Referring to FIG. 5, for the disclosed systems and methods, the data is spread over multiple OFDM subcarriers 104. In this example, the 64-bit orthogonal matrix is mapped to a plurality of OFDM subcarriers 104a. This technique does not require a pilot algorithm and can function independently. It can be implemented using any traditional OFDM construct such as cyclic prefixes.

Figure 6:
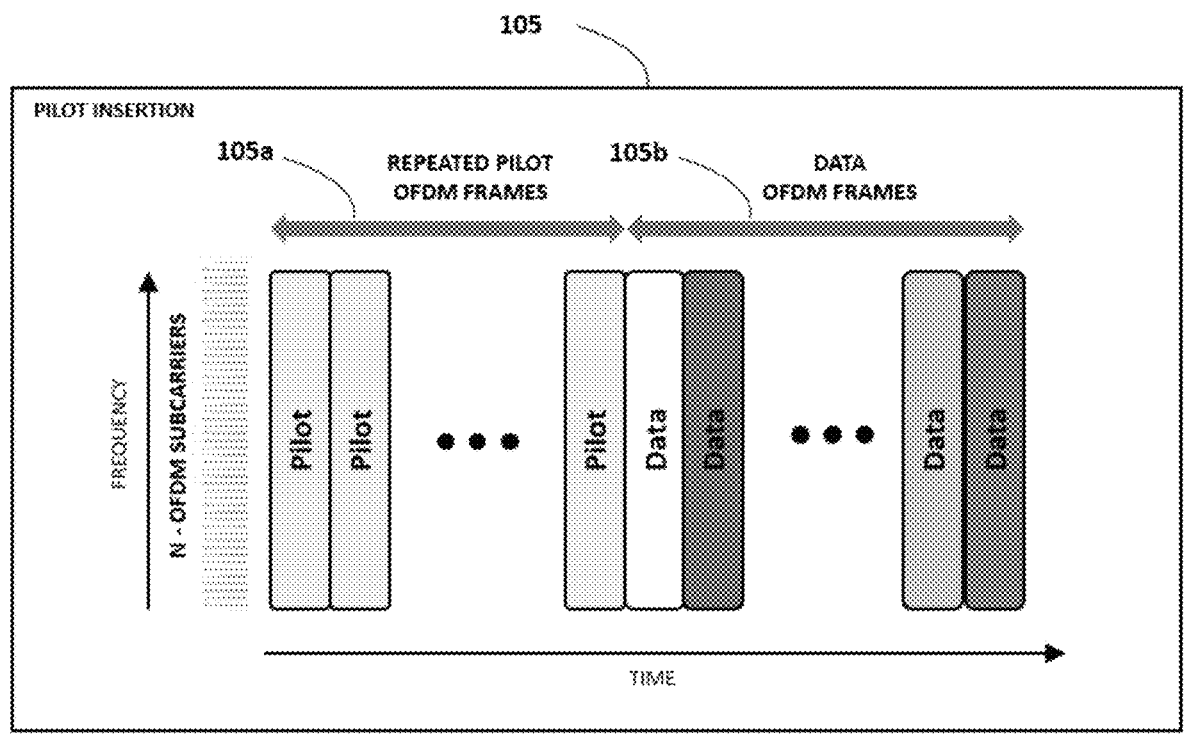
FIG. 6 illustrates a pilot algorithm inserted prior to the data OFDM frames in the transmission burst.

Referring back to FIG. 1, a repetitive pilot algorithm 105, each with the same OFDM modulation, is transmitted for the duration of "32" OFDM frames. With reference to FIG. 6, the pilot algorithm is inserted 105 prior to the data OFDM frames 105b in the transmission burst. The pilot is a repetitive 1024-OFDM frame 105a modulated by a data pattern called the "KEY" that is known to both the transmitter and receiver. This pilot algorithm is critical in timing and frequency alignment. It also makes the radio signal extremely difficult to detect by eavesdroppers. The low-power pilot and utilization of pilot KEY data makes it very difficult to be detected by cyclo-stationary detection or without knowing the key. The frequencies and modulation of the OFDM system are orthogonal to each other to eliminate interference between channels. The OFDM communication system allows a number of low-rate symbol streams to be transmitted simultaneously on multiple carriers rather than having one high-rate symbol stream transmitted on a single carrier. The number of pilot repetitions and amplitude with respect to data OFDM frames 105b may vary dependent on desired SNR performance.

Referring to FIG. 1, the OFDM user data follows immediately after the OFDM pilot 105. Once the burst is formed, an inverse FFT 106 is performed before final transmission. The pilot timing information is used for data recovery. The receiver uses the received pilot data to recover the timing and channel 300 information. The channel 300 could be any form of transmission media to include wired and non-wired mediums. The maximum length of the burst depends on the accuracy of the oscillator clock of the receiver, which determines the duration that timing synch persists. For example, with a clock accuracy of 1 part per million (PPM), this method can support a burst length of 100 milliseconds (ms).

Figure 7:
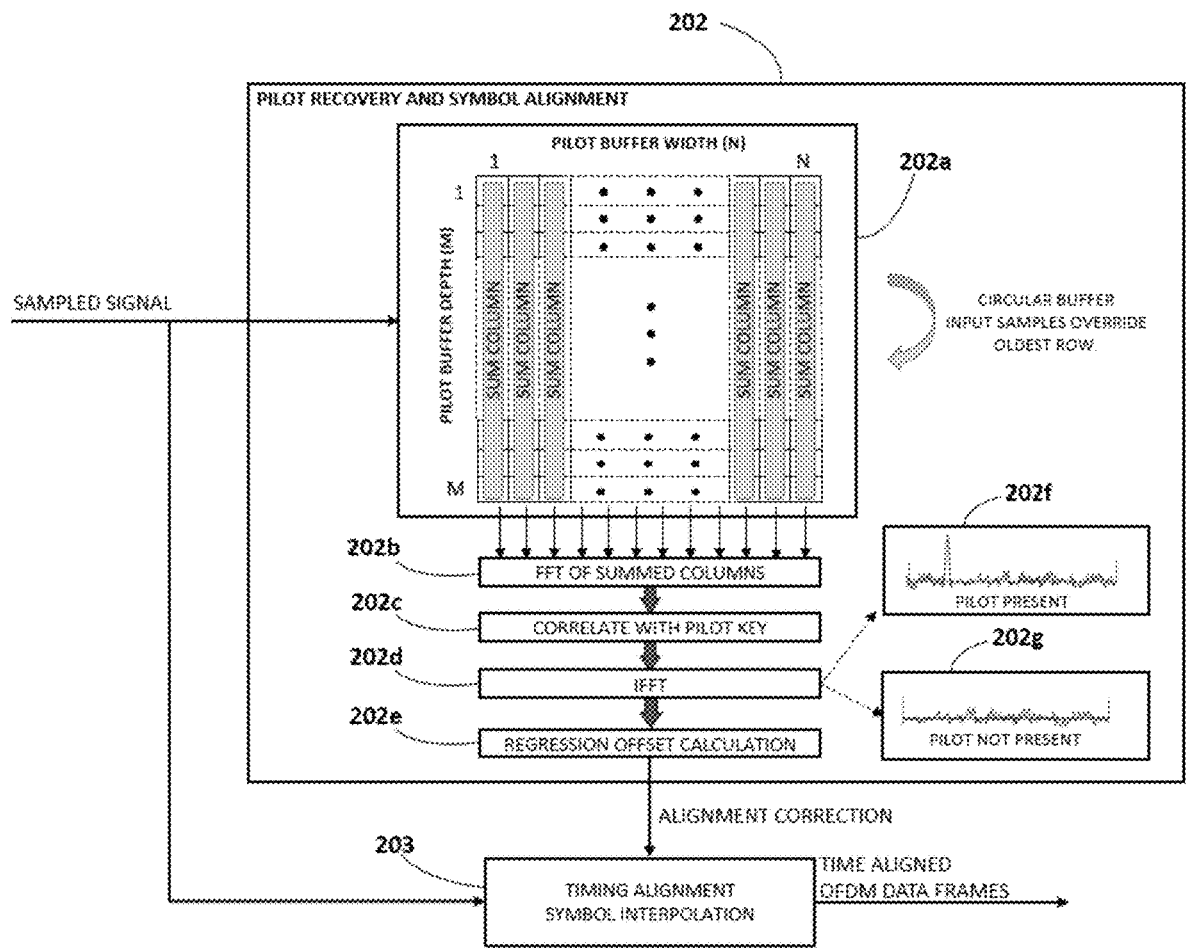
FIG. 7 shows a graph depicting a pilot recovery step, including the pilot width and pilot depth.

As shown in FIG. 1, the receiver receives the transmitted data and uses a demodulator 200a to process the data in the reverse order of the aforementioned process. Referring also to FIG. 7, there is shown a graph depicting the Pilot Recovery 202 step, including pilot width and pilot depth. The SOCC decoder 205 assumes that the received burst signal is time aligned to properly correlate each OFDM vector. This is accomplished with a novel pilot scheme designed to function in very low SNR channels. When the receiver is in burst detection mode, the receiver captures samples in "1024" intervals within the channel and performs an FFT 201 of the samples. The burst detection mode is described as when the demodulator is not actively processing a received transmission burst but actively seeking a burst. Further, the receiver places the FFT samples into the receiver's circular buffer 202a. When a new set of "1024" IQ samples are collected, the circular buffer overrides the oldest row of samples. Upon placing a new set of samples into the buffer, each column of the buffer is summed and an FFT performed of the summed columns resulting in a "1024" vector 202b. The vector is then correlated with the known KEY pattern 202c used to generate the pilot, and then an inverse FFT is performed on the resulting vector 202d. The resulting output of the inverse FFT represents the time delta function of the received burst transmitted through the channel when the pilot is present and detected 202f. If a pilot is not present 202g, there will be no correlation peak. Due to the repetitive nature of the pilot signal, the receiver block does not need to be aligned exactly with the transmitted frame. Instead, the relative location of the received peak provides the timing information of transmission data to the receiver. The shape of the received pulse also provides the channel fading information. The pilot depth can be extended to support detection in lower SNR channels or reduced to improve capacity throughput but operate in higher SNR channels.

Referring to both FIG. 1 and FIG. 7, when the Pilot Recovery 202 detects the presence of a burst, the corrected channel and timing alignment values used by the Timing Alignment 203 block to align the received samples to the start of the first data sample of the burst. The OFDM data symbol offset is corrected by interpolating the samples to compensate for channel impairment.

Referring to FIG. 1, after channel compensation, each 64-subcarrier set goes through the symbol correlator 204 to calculate its correlation with each of the 64 Hadamard vectors. A decoder calculates the correlation energy of the receiver signal with all "64" orthogonal vectors and sends the correlation results to the SOCC decoder 205. The output energy of the correlator 204 is used as input weight for the SOCC Viterbi decoder 205. The SOCC decoder 205 uses a soft-decision decoding algorithm for orthogonal codes and SOCC.

For systems implementing block encoding and interleaving, the output from the SOCC decoder 205 can be de-interleaved and further decoded. The data can be de-interleaved 206 using a de-interleaver and can be decoded 207 using a block decoder. Those of ordinary skill in the field will understand how standard block decoders and interleavers function.

Figure 8:
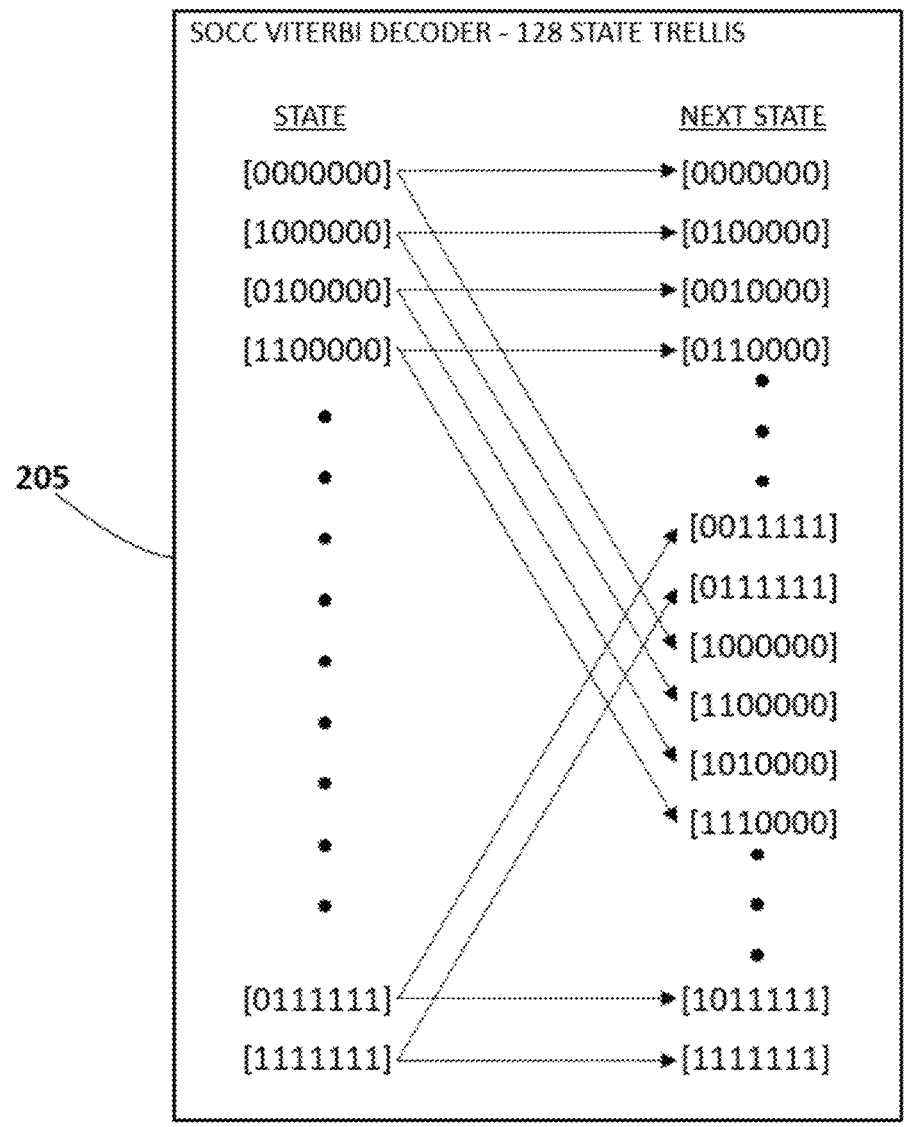
FIG. 8 illustrates an example trellis of a SOCC Viterbi decoder.

Referring to FIG. 8, there is shown an example trellis of the SOCC Viterbi decoder 205. The index of each of the one hundred and twenty-eight states shown is the register value of R1-R7 113 and XOR 123 in an example that has seven registers. To calculate the weight of each branch (trellis), the SOCC decoder 205 uses the corresponding weight from the correlator 204 to calculate the weight of each trellis. For example, to calculate the branch weight of state 1101001 to 0110100, the decoder 205 calculates the output of the SOCC encoder 103 for input of 01101001 and finds the weight of such output data from the symbol correlator 204. When two branches converge, the surviving branch will be the one that has the higher weight. The number of generated SOCC states and the trellis decoder length is not limited. As aforementioned, there can be an arbitrary number of registers, which also allows for an arbitrary number of generated SOCC states and trellis decoder lengths.

Alternatively, the SOCC encoder 103, Data OFDM Mapper 104, Pilot Insertion 105, Pilot Recovery 202, Data Frame Alignment 203, Symbol Correlator 204 and SOCC decoder 205 could be used in any combination with any other components of a signal processing path regardless of component type or implementation (e.g., forward error correction, error detection, interleaving, synchronization, equalization, gain, scrambling, etc.).

It should be understood that different radios can be used, including but not limited to software defined radios (SDR), that can be typically implemented with relatively standard processor and hardware components. One particular class of software radio is the Joint Tactical Radio (JTR), which includes relatively standard radio and processing hardware along with any appropriate waveform software modules to implement desired communication waveforms. JTR radios also use operating system software that conforms to the software communications architecture (SCA) specification. The SCA is an open architecture framework that specifies how hardware and software components are to interoperate, so that different manufacturers and developers can readily integrate the respective components into a single device.

The invention claimed is:

1. A method of communicating, comprising:
   a. providing a first radio, wherein the first radio comprises a transmitter and a receiver;
   b. providing a second radio, wherein the second radio comprises a transmitter and a receiver;
   c. encoding data using an outer block encoder;
   d. interleaving the output of the outer block encoder using an interleaver;
   e. generating an inner code using a super orthogonal convolution code (SOCC) encoder;
   f. encoding the output of the interleaver using the inner code;
   g. mapping the output of the SOCC encoder using an orthogonal frequency division multiplexing (OFDM) mapper, to a plurality of OFDM subcarriers;
   h. inserting a plurality of repetitive pilot frames based on pilot key data algorithms, prior to data frames, to form a transmission burst, wherein each pilot frame is generated by modulating an OFDM frame with a key data pattern;
   i. modulating, using the transmitter of the first radio, the plurality of OFDM subcarriers including the output of the OFDM mapper with the transmission burst, wherein the modulation does not use a cyclic prefix;
   j. performing an inverse fast Fourier transform (IFFT) on modulated transmission burst to form an OFDM signal; and
   k. transmitting the OFDM signal from the first radio to the second radio.

2. The method of claim 1, further comprising:
   a. receiving the OFDM signal at the second radio;
   b. performing a fast Fourier transform (FFT);
   c. recovering timing information of the first radio using the pilot key data;
   d. demodulating the plurality of OFDM subcarriers;
   e. aligning the data using a data frame aligner;
   f. calculating correlation energy of the OFDM signal using a symbol correlator;
   g. decoding the data using a SOCC decoder, wherein the SOCC decoder uses a Viterbi algorithm;
   h. de-interleaving the data using a de-interleaver; and
   i. decoding the data using a block decoder.

3. The method of claim 1, wherein the SOCC encoder includes a pipeline of single bit registers, and further comprising the steps of:
   a. using the registers to map output to a vector, wherein the vector is one of a set of orthogonal vectors; and
   b. using input data and the registers to determine whether the polarity of output vector shall be reversed.

4. The method of claim 1, further comprising:
   a. transmitting a repetitive pilot, wherein the pilot is the IFFT of a key vector that is known to both the first radio transmitter and the second radio receiver.

5. The method of claim 2, wherein the recovering of timing information step further comprises:
   a. auto correlating of input to generate an auto correlation output, wherein the input has the same frame length of OFDM frame;
   b. performing an IFFT to the auto correlation output to generate an IFFT output;
   c. correlating the IFFT output with key data to generate an IFFT correlation output;
   d. providing a timing recovery algorithm; and
   e. using the timing recovery algorithm to calculate timing of the aligned data frame based on the IFFT correlation output.

6. The method of claim 2, wherein the decoding the data step further comprises:
   a. using correlation of output from the OFDM demodulation with an orthogonal matrix set as the weight of a branch;
   b. determining a surviving branch based on the weight of a plurality of merging branches.

7. A system for communicating, comprising:
a. a first radio, wherein the first radio comprises a transmitter and a receiver;
b. a second radio, wherein the first radio comprises a transmitter and a receiver;
c. the first radio further comprises an outer block encoder for encoding data;
d. the first radio further comprises an interleaver for interleaving the output of the outer block encoder;
e. the first radio further comprises a super orthogonal convolution code (SOCC) encoder for generating an inner code;
f. wherein the inner code is used to encode the output of the interleaver;
g. an orthogonal frequency division multiplexing (OFDM) mapper, the OFDM mapper is configured to map the output of the SOCC encoder to a plurality of OFDM subcarriers;
h. the first radio further comprises a pilot insertion unit that insert a plurality of repetitive pilot frames based on pilot key data algorithms, prior to data frames, to form a transmission burst, wherein each pilot frame is generated by modulating an OFDM frame with a key data pattern;
i. wherein the first radio is configured to modulate the plurality of OFDM subcarriers including the output of the OFDM mapper with the transmission burst, wherein the modulation does not use a cyclic prefix;
j. wherein the first radio is configured to perform an inverse fast Fourier transform (IFFT) on modulated transmission burst to form an OFDM signal; and
k. wherein the first radio transmitter is configured to transmit the OFDM signal from the first radio to the second radio.

8. The system of claim 7, further comprising:
a. wherein the second radio receiver is configured to receive the OFDM signal;
b. wherein the second radio is configured to perform a fast Fourier transform (FFT);
c. wherein the second radio is configured to recover timing information of the first radio using the pilot key data;
d. wherein the second radio is configured to demodulate the plurality of OFDM subcarriers;
e. the second radio further comprises a data frame aligner for aligning the data;
f. the second radio further comprises a symbol correlator for calculating correlation energy of the OFDM signal;
g. the second radio further comprises a SOCC decoder for decoding the data, wherein the SOCC decoder uses a Viterbi algorithm;
h. the second radio further comprises a de-interleaver for de-interleaving the data; and
i. the second radio further comprises a block decoder for decoding the data.

\* \* \* \* \*